(12) United States Patent
Dillon et al.

(10) Patent No.: US 12,114,608 B1
(45) Date of Patent: Oct. 15, 2024

(54) TINE ASSEMBLY FOR AGRICULTURAL EQUIPMENT

(71) Applicants: Cory J. Dillon, Bennington, NE (US); Todd Dillon, Arlington, NE (US)

(72) Inventors: Cory J. Dillon, Bennington, NE (US); Todd Dillon, Arlington, NE (US)

( * ) Notice: Subject to any disclaimer, the term of this patent is extended or adjusted under 35 U.S.C. 154(b) by 691 days.

(21) Appl. No.: 17/336,457

(22) Filed: Jun. 2, 2021

Related U.S. Application Data

(60) Provisional application No. 63/048,241, filed on Jul. 6, 2020.

(51) Int. Cl.
*A01D 80/02* (2006.01)
(52) U.S. Cl.
CPC .................................. *A01D 80/02* (2013.01)
(58) Field of Classification Search
CPC .. A01D 80/00; A01D 80/02; A01D 7/00–7/10
See application file for complete search history.

(56) References Cited

U.S. PATENT DOCUMENTS

| | | | |
|---|---|---|---|
| 3,481,125 A * | 12/1969 | Miller | A01D 80/02 56/400 |
| 4,473,994 A | 10/1984 | Hein | |
| 4,481,758 A | 11/1984 | Fishbaugh | |
| RE32,522 E * | 10/1987 | Fishbaugh | A01D 80/02 56/400 |
| 4,745,736 A | 5/1988 | Copley | |
| 8,209,947 B2 | 7/2012 | McClure et al. | |
| 8,312,700 B2 | 11/2012 | Leiston | |
| 10,412,892 B2 * | 9/2019 | Rowse | A01D 80/02 |
| 10,624,268 B2 * | 4/2020 | Rowse | A01D 80/02 |
| 11,596,099 B2 * | 3/2023 | Rowse | A01D 80/02 |
| 2019/0053432 A1 * | 2/2019 | Rowse | A01D 80/02 |

* cited by examiner

*Primary Examiner* — Adam J Behrens
*Assistant Examiner* — Madeline I Runco
(74) *Attorney, Agent, or Firm* — Milligan PC LLO

(57) ABSTRACT

The present invention provides an improved tine assembly for use with conventional agricultural equipment and systems. According to a first preferred embodiment, the tine assembly of the present invention may preferably include a pair of tine teeth with hooked ends embedded within a rubber base. According to a further preferred embodiment, the improved tine assembly includes a steel base plate attached to the underside of the rubber base. Additionally, the steel base plate preferably includes lateral tabs which connect to the base plate and mechanically engage with the hooked ends of each tooth.

9 Claims, 7 Drawing Sheets

TINE ASSEMBLY FOR AGRICULTURAL EQUIPMENT

RELATED APPLICATIONS

The present application claims priority to U.S. Provisional Application No. 63/048,241 filed Jul. 6, 2020.

BACKGROUND AND FIELD OF THE PRESENT INVENTION

Field of the Present Invention

The present invention relates generally to an improved tine and, in particular, to an improved tine assembly for use with agricultural equipment.

Background of the Invention

There are several types of agricultural equipment which require the use of tines to gather cut materials. Tines attach to different components of various machines (i.e. balers, hay rakes etc.) which rotate the tines through a cut crop (such as hay or flax straw). For example, FIG. 11 shows tines 14 attached in groups to a rotating "pickup" 12 of a baler 10. In this way, groups of tines 14 rake, and intake cut material into the baler 10. The most commonly used tine is the spring tine 14 which is generally formed as one or two extensions of metal 16 connected together by a connecting torsion spring 18. Both single and double torsion springs are commonly used.

The main problem with prior art tines is that they are prone to dislocations and breakages. For this reason, various types of tines have been tried. For example, U.S. Pat. No. 4,745,736 teaches embedding a single tooth within a rubber base. Similarly, U.S. Pat. Nos. 8,209,947 and 8,312,700 each teach embedding multiple teeth within a rubber base. Despite these redesigns, tines continue to be subject to dislocations and breakages due to the amount of stress, shear and pressure applied to each tine during various applications.

To overcome the limitations of the prior art, an improved tine assembly is needed which is able to provide improved reliability and wear resistance over time.

SUMMARY OF THE INVENTION

To minimize the limitations found in the prior art, and to minimize other limitations that will be apparent upon the reading of the specifications, the present invention provides an improved tine assembly for use with various agricultural machines and systems.

According to a first preferred embodiment, the tine assembly of the present invention may preferably include a pair of tine teeth with hooked ends embedded within a rubber base.

According to a further preferred embodiment, the improved tine assembly preferably may include a steel base plate which is attached to the underside of the rubber base.

According to a further preferred embodiment, the steel base plate preferably may include a first lateral tab which connects to the base plate and mechanically engages with a first hooked end of a first tooth. The present invention may also include a second lateral tab which connects to the base plate and mechanically engages with a second hooked end of a second tooth.

DETAILED DESCRIPTION OF THE PREFERRED EMBODIMENTS

Reference is now made in detail to the exemplary embodiments of the invention, examples of which are illustrated in the accompanying drawings. Wherever possible, the same reference numbers will be used throughout the drawings to refer to the same or like parts. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to'), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Figure 1:
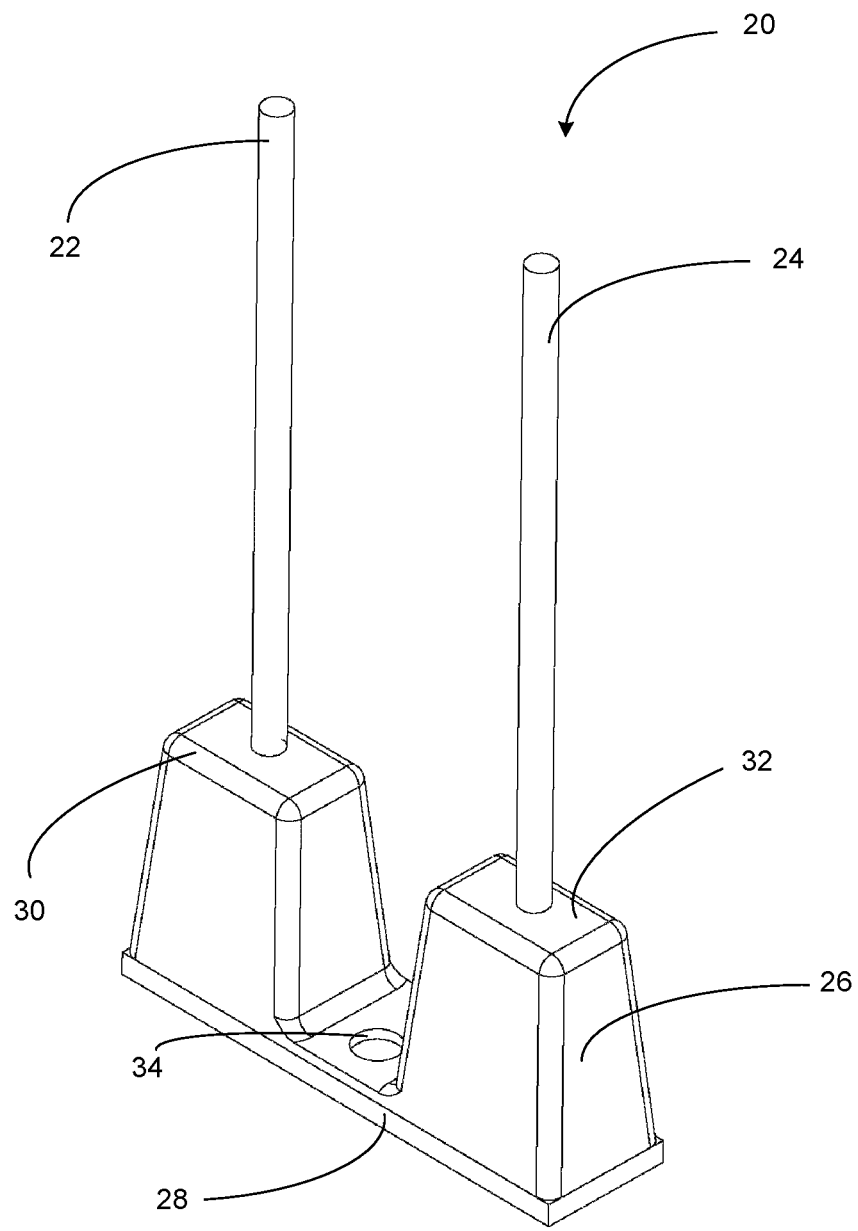
FIG. 1 is a perspective view of an exemplary tine assembly in accordance with the present invention.

With reference now to FIGS. 1-10, an improved tine assembly 20 which resists wear and breakages shall now be discussed. With reference to FIG. 1, the exemplary tine assembly 20 preferably includes a first steel tooth 22 attached within a first securing body 30; and a second steel tooth 24 attached within a second securing body 32. The securing bodies 30, 32 are preferably integrally formed as part of a rubber base 26. Preferably, the teeth 22, 24 are made of steel. Alternatively, the teeth 22, 24 may be formed from any other type of material including other metals and plastics. The rubber base 26 is preferably formed of a rubber compound or the like. The rubber base 26 may be formed from any type of rubber or other flexible materials without limitation.

As discussed, the securing bodies 30, 32 are preferably formed from rubber and attached or formed together to form a rubber base 26. The rubber base 26 is preferably attached to a base plate 28. The rubber base 26 and the base plate 28 preferably each include a central cavity 34 to allow the tine 20 to be attached to a baler or other agricultural machine. The base plate 28 is preferably formed from steel but may alternatively be formed of any other type of metal, metal compound or even plastic material.

Figure 3:
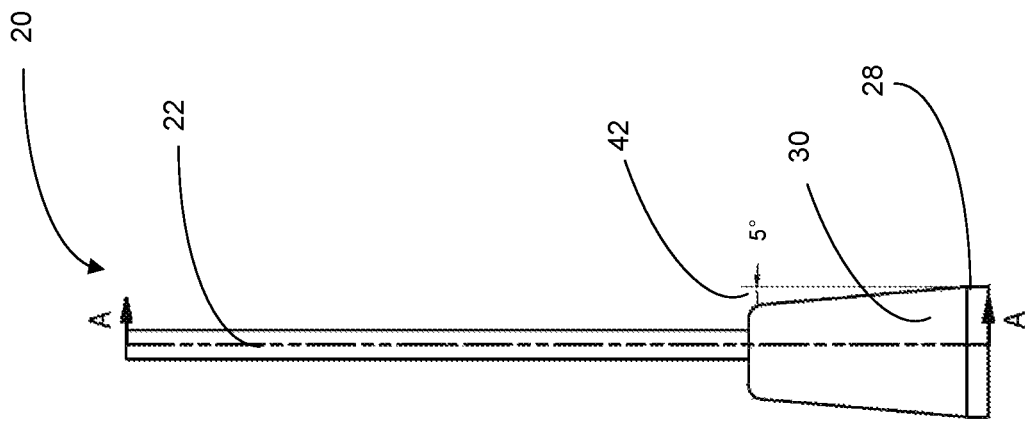
FIG. 3 is a side elevation view of the exemplary tine assembly shown in FIG. 2.
Figure 2:
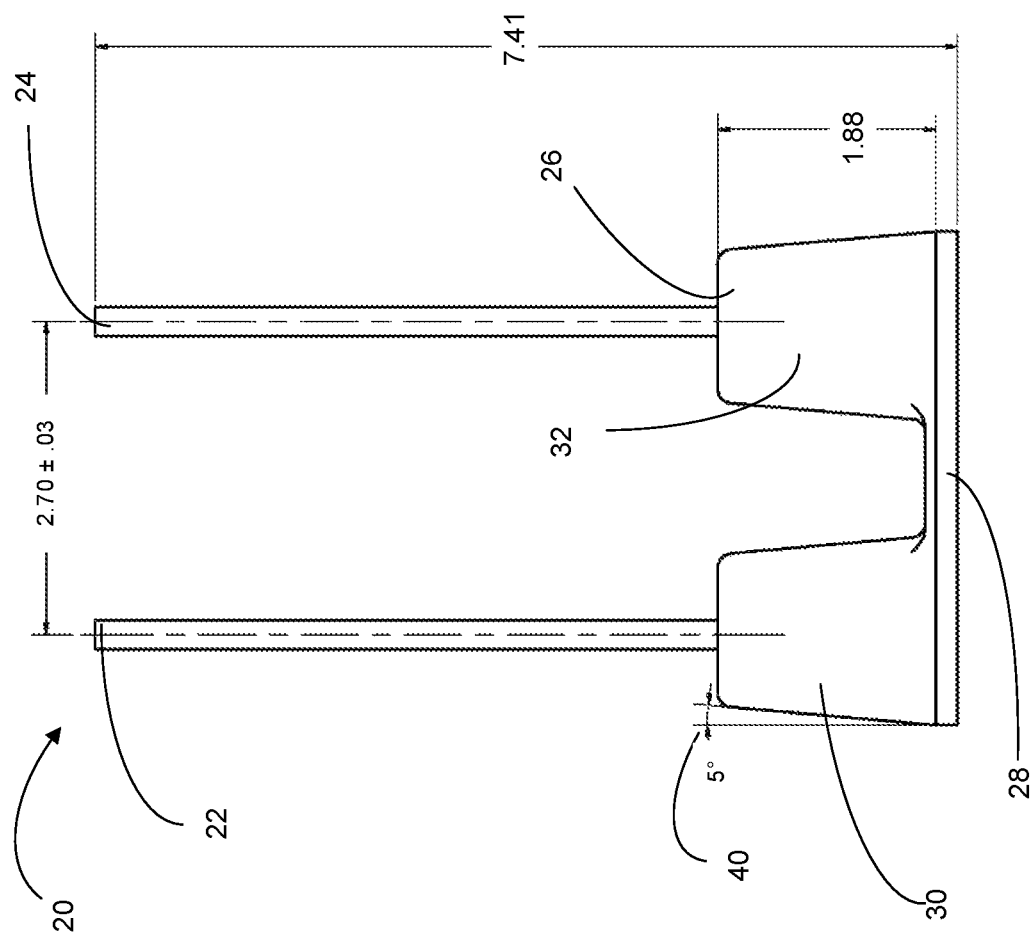
FIG. 2 is a front elevation view of the exemplary tine assembly shown in FIG. 1.

With reference now to FIGS. 2 and 3, front and side elevation views of the exemplary tine assembly 20 are provided. In accordance with a first preferred embodiment of the present invention, the exemplary tine 20 may preferably have a total length of approximately 7.41 inches, and each securing body 30, 32 may have a height of approximately 1.88 inches. The distance between each tooth 22, 24 may preferably be approximately 2.7 inches. The securing bodies 30, 32 are preferably formed as conical projections which preferably have a lateral taper 40, 42 (front-to-back and side-to-side) of approximately 5 degrees. According to alternative preferred embodiments, each of these preferred dimensions (including taper angels) may preferably be adjusted by plus-or-minus 5-15% or more. Additionally, the size and shape of each element including each tooth 22, 24 and the rubber base 26 may be further modified and adjusted as desired without departing from the scope of the present invention.

Figure 4:
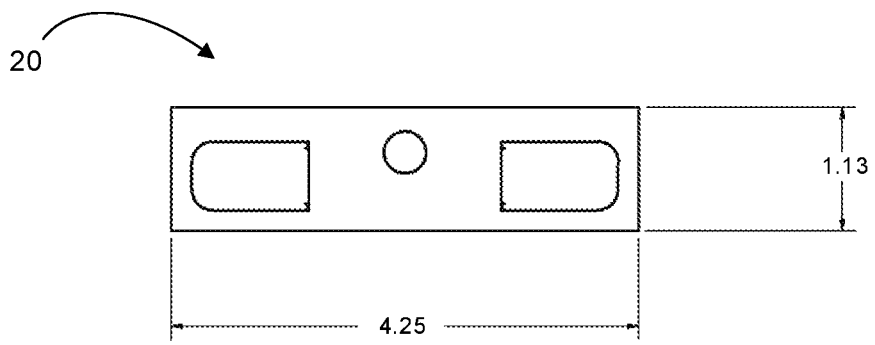
FIG. 4 is a bottom view of the exemplary tine assembly shown in FIG. 2.
Figure 5:
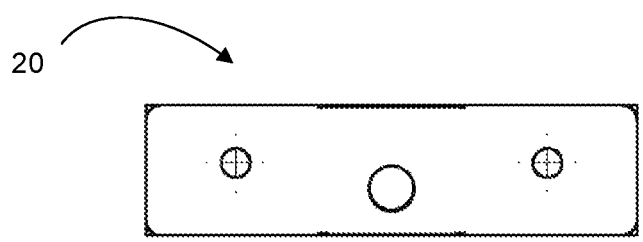
FIG. 5 is a top view of the exemplary tine assembly shown in FIG. 2.

FIG. 4 provides a bottom view of the exemplary tine assembly 20 shown in FIG. 2. As shown, the tine assembly 20 at its base may preferably have dimensions of approximately 4.25×1.13 inches. These dimensions may also be adjusted by plus-or-minus 5-15% or more. FIG. 5 provides a top view of the exemplary tine assembly 20. As discussed above, the size and shape of each element of the exemplary tine assembly 20 may be modified and adjusted as desired without departing from the scope of the present invention.

Figure 6:
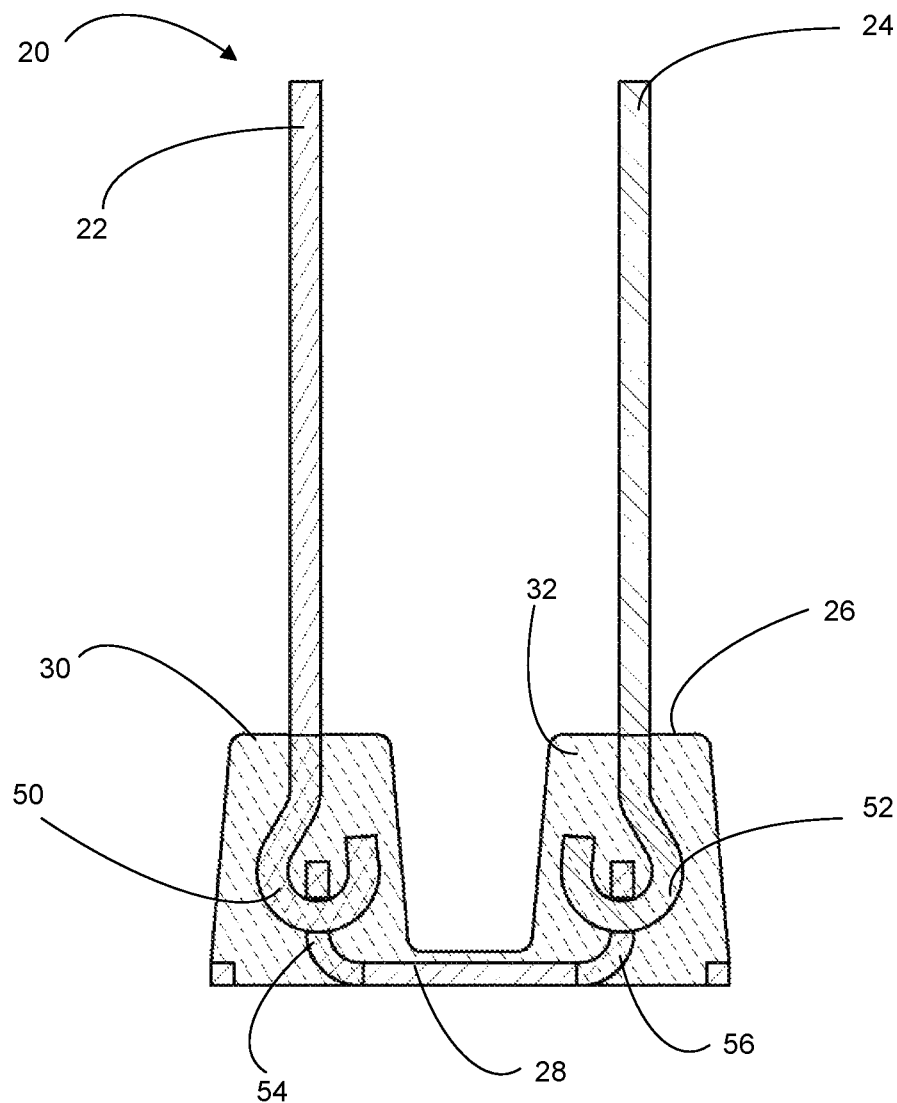
FIG. 6 is a cut-away side view of the exemplary tine assembly cut along the line A-A shown in FIG. 3.

With reference now to FIG. 6, a cross-sectional view of the exemplary tine assembly 20 (cut along the line A-A shown in FIG. 3) is provided. The steel teeth 22, 24 as shown are preferably linear, steel projections, each including a securing hook 50, 52 which is embedded within the rubber base 26, 30. As shown, the present invention preferably further includes stabilizing tabs 54, 56 which are secured to (or integral with) the steel base 28. The stabilizing tabs 54, 56 preferably connect/engage with the first and second hooked ends 50, 52 of each respective steel tooth 22, 24 as discussed further below.

Figure 8:
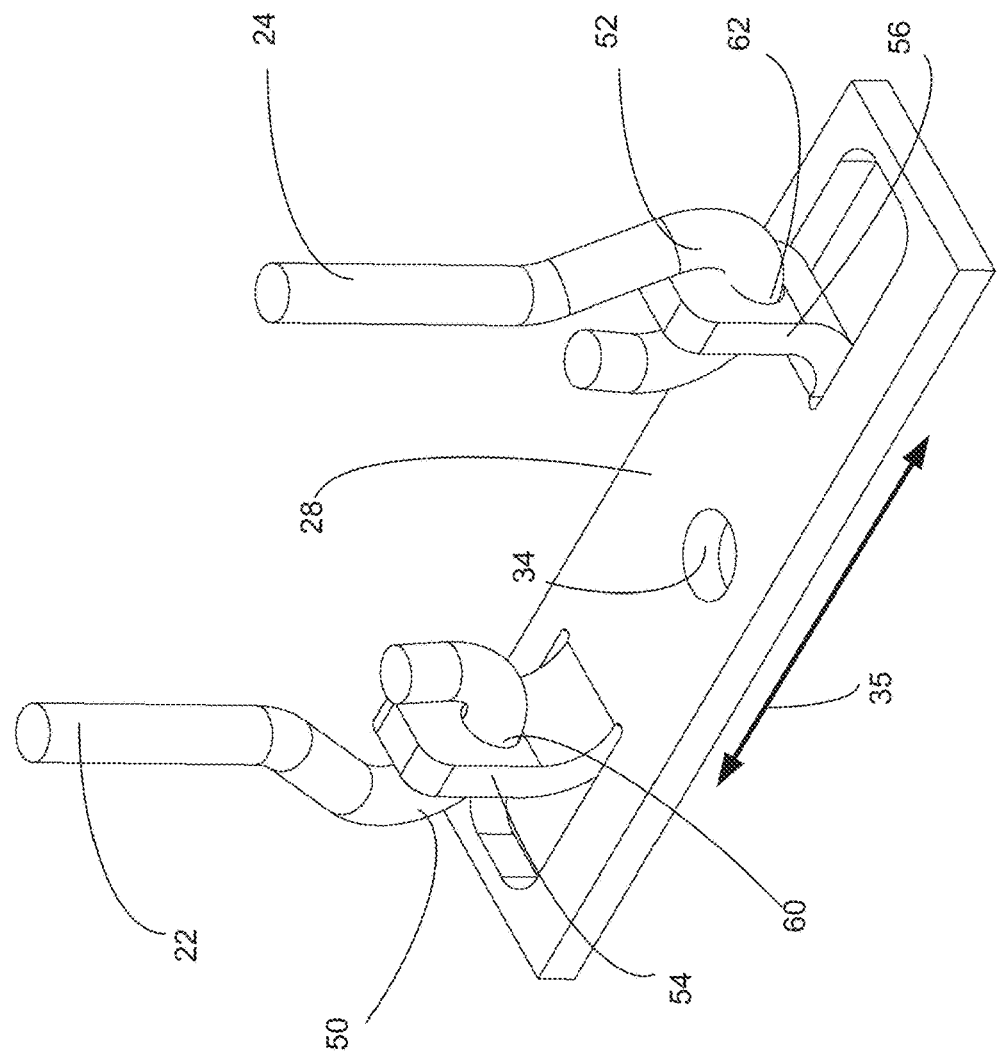
FIG. 8 is an enlarged view of the interior tine assembly shown in FIG. 7.
Figure 7:
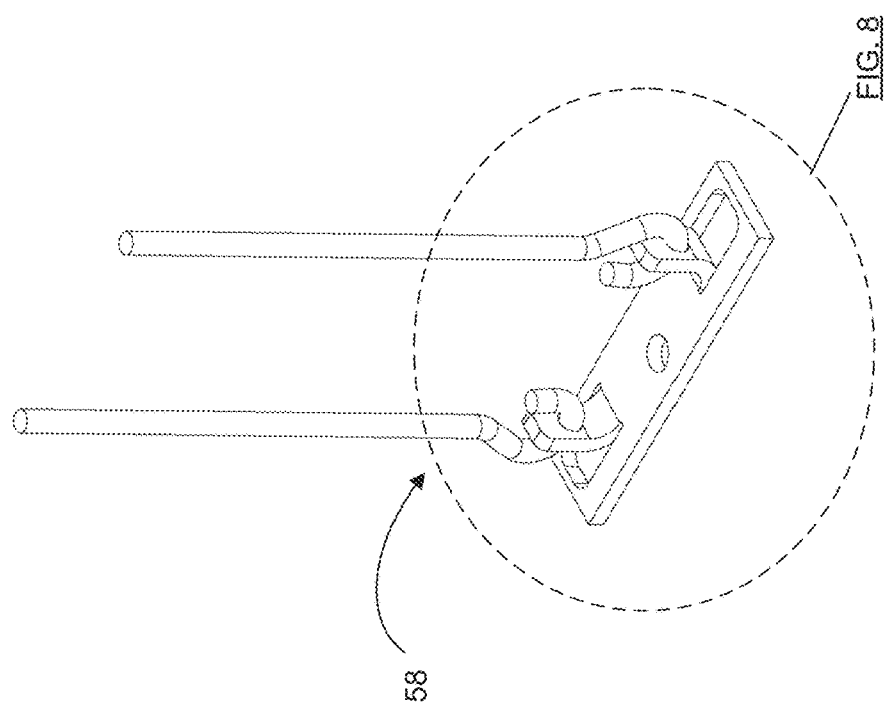
FIG. 7 is a perspective view of an exemplary interior tine assembly.

With reference now to FIGS. 7 and 8, isolated views of the interior tine assembly 58 are provided. As shown, the interior tine assembly 58 preferably includes securing hooks 50, 52 which are inserted through hook holes 60, 62 provided within each respective securing tab 54, 56. In this way, each tooth 22, 24 (via respective hooked ends 50, 52) mechanically engages with the steel base plate 28. According to a preferred embodiment, the securing tabs 54, 56 may be integrally formed with the base plate 28. Alternatively, the base plate 28 and the securing tabs 54, 56 may be separately formed and composed of any number of sub-assemblies which are secured together by welds or adhesives. As shown, the base plate 28 is preferably comprised of a planar, rectangular body formed with a length and width extending laterally in a primary plane. As further shown, the base plate 28 preferably further includes a central cavity 34 which is centrally formed within the base plate 28, between the securing tabs 54, 56 and oriented perpendicular to the long axis 35 and primary plane of the base plate 28.

Figure 10:
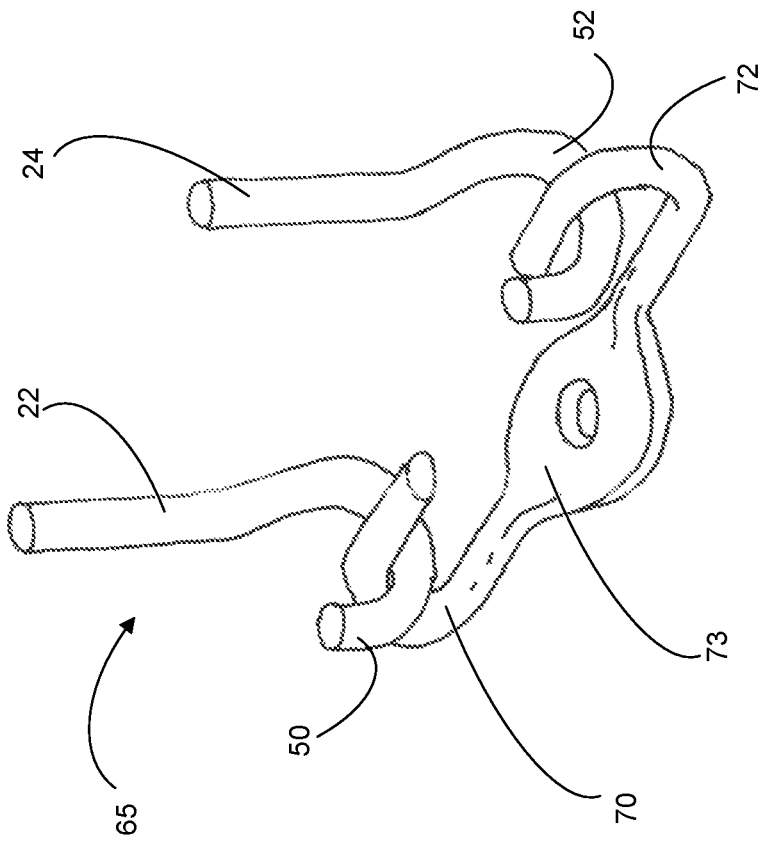
FIG. 10 is an enlarged view of a second alternative interior tine assembly.
Figure 9:
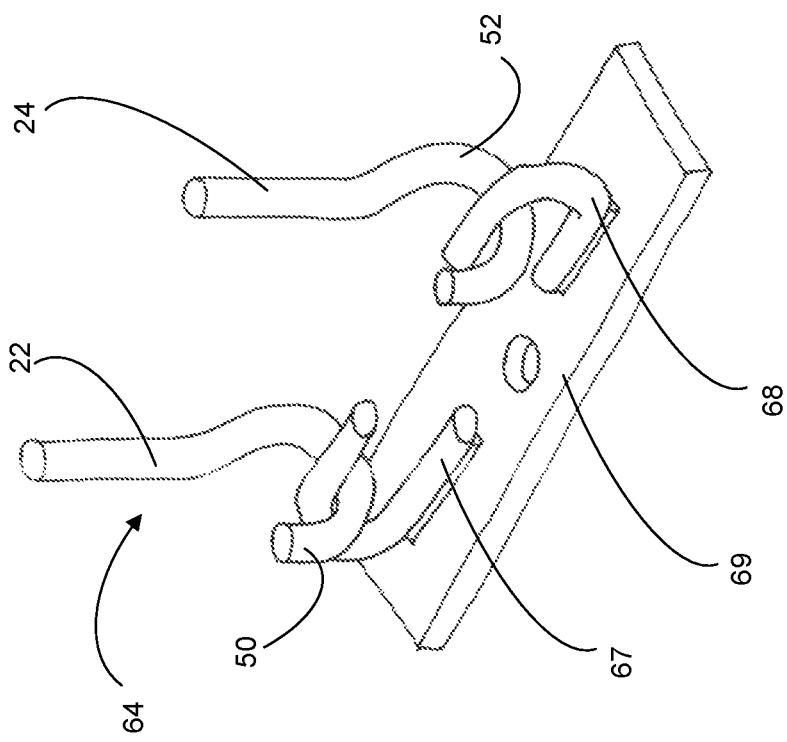
FIG. 9 is an enlarged view of a first alternative interior tine assembly.
Figure 11:
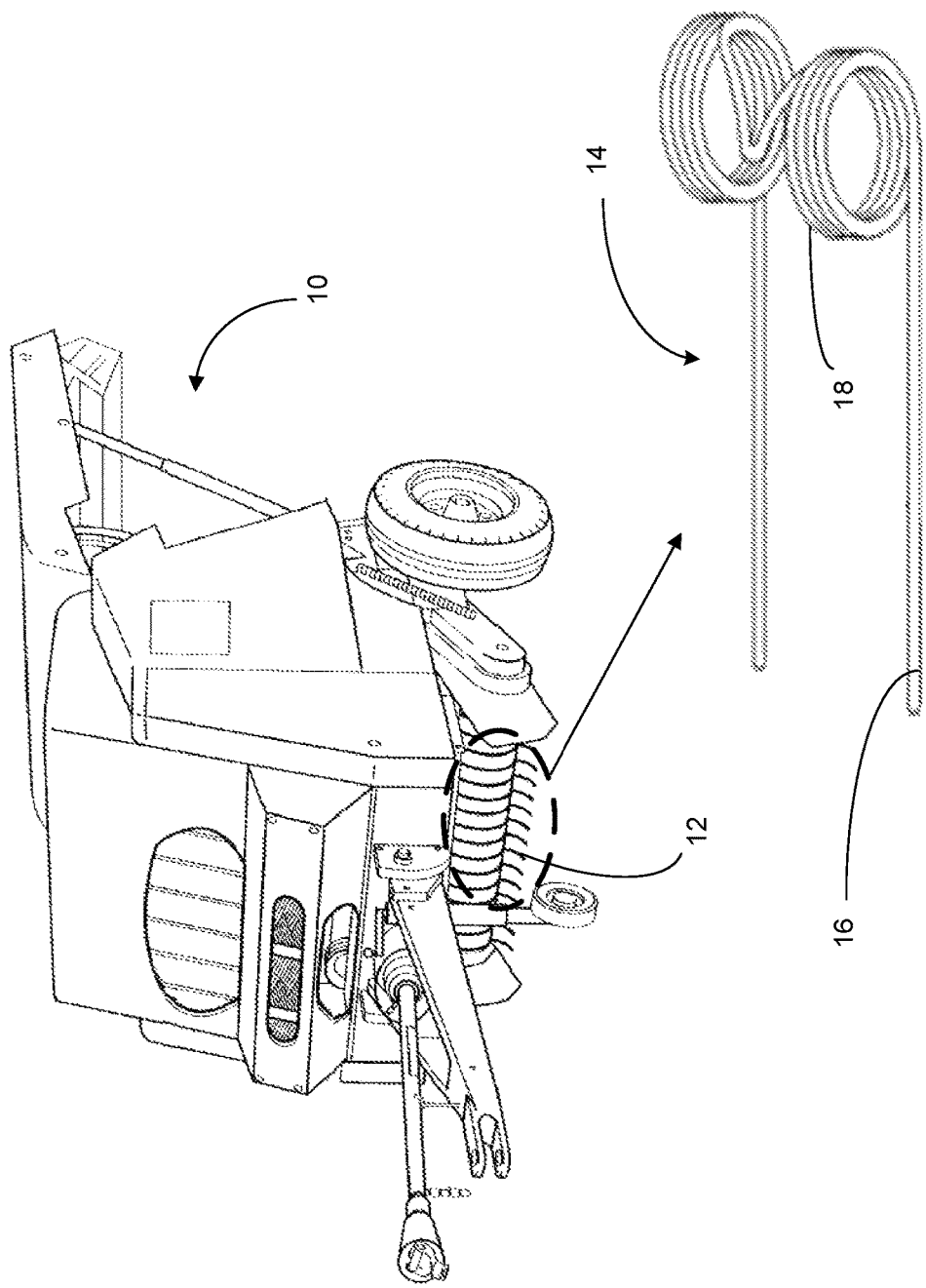
FIG. 11 is a perspective view of a hay baler and a tine design as known in the prior art.

The tine assembly of the present invention may be formed in any number of alternative arrangements which allow the respective hooked ends 50, 52 of the assembly to mechanically engage with the steel base plate 28. For example, FIGS. 9 and 10 illustrate two alternative embodiments 64, 65. With reference to FIG. 9, a first alternative embodiment 64 may include connected or integral hooks 67, 68 which extend upward from the base plate 69 and which are formed to loop over and mechanically engage with respective hooks 50, 52. With reference now to FIG. 10, a further alternative embodiment 65 is shown where the base plate 73 includes narrowing ends 70, 72 which form upward extending hooks 70, 72 which similarly loop over and mechanically engage with respective hooks 50, 52. Additional alternative embodiments may similarly be added and/or formed to allow elements of the base plate of the present invention to provide stability and support to the tine assembly without limitation.

While the invention has been illustrated and described as embodied in a particular tine assembly, it is not intended to be limited to the details shown, since it will be understood that various omissions, modifications, substitutions and changes in the forms and details of the device illustrated and in its operation can be made by those skilled in the art without departing in any way from the spirit of the present invention.

The scope of the present invention should be determined not by the embodiments illustrated, but by the appended claims and their legal equivalents.

What is claimed is:

1. An improved tine assembly, wherein the tine assembly comprises:
   a first tooth, wherein the first tooth comprises a first linear body and a first hooked end;
   a second tooth, wherein the second tooth comprises a second linear body and a second hooked end;
   a rubber base, wherein the rubber base comprises a first conical projection and a second conical projection;
   a base plate, wherein the base plate comprises a planar, rectangular body formed with a length and width extending in a primary plane; wherein the base plate further comprises a central cavity; wherein the central cavity is oriented perpendicular to the primary plane of the base plate; and
   a first lateral tab and a second lateral tab; wherein the first lateral tab comprises a first curved end; wherein the second lateral tab comprises a second curved end; wherein the first and second lateral tabs are embedded within the rubber base and connected to the base plate; wherein the central cavity is formed between the first lateral tab and the second lateral tab;
   wherein the first hooked end of the first tooth is embedded within the first conical projection; wherein the second hooked end of the second tooth is embedded within the second conical projection;
   wherein the first curved end of the first tab is mechanically engaged with the first hooked end of the first tooth; further wherein the second curved end of the second tab is mechanically engaged with the second hooked end of the second tooth.

2. The tine assembly of claim 1, wherein the first hooked end comprises a hook type selected from a first group of hook types; wherein the first group of hook types comprises: an eye hook, an L hook, a J hook, and a pigtail hook.

3. The tine assembly of claim 2, wherein the second hooked end comprises a hook type selected from a second group of hook types; wherein the second group of hook types comprises: an eye hook, an L hook, a J hook, and a pigtail hook.

4. The tine assembly of claim 3, wherein the first hooked end of the first tooth extends under at least a portion of the first curved end of the first tab.

5. The tine assembly of claim 4, wherein the second hooked end of the second tooth extends under at least a portion of the second curved end of the second tab.

6. The tine assembly of claim 5, wherein the first lateral tab comprises a first securing hole within the first curved end.

7. The tine assembly of claim 6, wherein the first hooked end of the first tooth is inserted through the first securing hole.

8. The tine assembly of claim 7, wherein the second lateral tab comprises a second securing hole within the second curved end.

9. The tine assembly of claim 8, wherein the second hooked end of the second tooth is inserted through the second securing hole.

\* \* \* \* \*